(12) United States Patent
Seidel et al.

(10) Patent No.: US 10,823,753 B2
(45) Date of Patent: Nov. 3, 2020

(54) AIR DATA PROBE WITH OPTICAL PRESSURE INTEGRATION

(71) Applicant: Rosemount Aerospace Inc., Burnsville, MN (US)

(72) Inventors: Greg Allen Seidel, Farmington, MN (US); Mark Sherwood Miller, Lakeville, MN (US); Kimiko Childress, Farmington, MN (US); Michael Paul Nesnidal, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 126 days.

(21) Appl. No.: 16/220,875

(22) Filed: Dec. 14, 2018

(65) Prior Publication Data

US 2020/0191823 A1 Jun. 18, 2020

(51) Int. Cl.
*G01P 13/02* (2006.01)
*G01P 5/165* (2006.01)
*B64D 43/00* (2006.01)

(52) U.S. Cl.
CPC ............ *G01P 13/025* (2013.01); *B64D 43/00* (2013.01); *G01P 5/165* (2013.01)

(58) Field of Classification Search
CPC ...... G01P 5/165; G01P 13/025; G01P 21/025; G01P 5/16; G01P 5/14; G01P 21/00; G01P 3/62; G01P 5/00; G01P 5/245; G01P 15/165; G01P 1/026; G01P 5/02; G01P 5/17; G01P 5/26; G01P 13/00; G01P 15/18; G01P 5/06; G01P 5/10; B64D 43/02; B64D 43/00; B64D 45/00; B64D 15/22; B64D 2045/0085; B64D 31/06; B64D 31/14; B64D 45/0005; B64D 15/12; B64D 15/20; B64D 1/02; B64D 1/16; G01F 1/46; G01F 1/44; G01F 15/14; G01F 1/40; G01F 1/68; G01F 1/74; G01F 15/125; G01F 1/05; G01F 1/115; G01F 1/1155; G01F 1/32; G01F 1/36; G01F 1/363; G01F 1/42; G01F 1/662; G01F 1/684; G01F 1/6888; G01F 1/69; G01F 25/0038
(Continued)

(56) References Cited

U.S. PATENT DOCUMENTS 5,458,008 A * 10/1995 Rassatt ................... G01P 5/165
73/861.65
5,616,861 A 4/1997 Hagen
(Continued)

FOREIGN PATENT DOCUMENTS

EP 1256812 A2 11/2002
EP 1256812 A3 5/2003
(Continued)

OTHER PUBLICATIONS

Notice of Amendment for Chinese Patent Application No. 201911285905.7, dated Jan. 6, 2020, 1 page.
(Continued)

*Primary Examiner* — Andre J Allen
(74) *Attorney, Agent, or Firm* — Kinney & Lange, P.A.

(57) ABSTRACT

An air data probe includes a probe head, a port within the probe head in fluid communication with external airflow, and a pneumatic pressure sensor mounted within the port.

20 Claims, 6 Drawing Sheets

(58) Field of Classification Search
USPC ........................................................ 73/170.02
See application file for complete search history.

(56) References Cited

U.S. PATENT DOCUMENTS

| | | | |
|---|---|---|---|
| 6,076,963 A * | 6/2000 | Menzies | G01K 13/02 |
| | | | 374/138 |
| 6,118,534 A | 9/2000 | Miller | |
| 6,250,149 B1 | 6/2001 | Black | |
| 6,430,996 B1 * | 8/2002 | Anderson | G01K 13/028 |
| | | | 73/170.26 |
| 6,672,152 B2 | 1/2004 | Rouse et al. | |
| 6,892,584 B2 * | 5/2005 | Gilkison | G01P 5/165 |
| | | | 73/1.29 |
| 8,095,251 B2 | 1/2012 | Preaux | |
| 8,820,170 B2 | 9/2014 | Slakhorst et al. | |
| 8,908,160 B2 | 12/2014 | Dakin et al. | |
| 9,927,456 B2 | 3/2018 | Genevrier et al. | |
| 10,018,489 B2 | 7/2018 | Moukharski et al. | |
| 10,564,173 B2 * | 2/2020 | Whalen | G01P 15/165 |
| 2011/0141471 A1 * | 6/2011 | Schlotterbeck | G01S 7/4818 |
| | | | 356/342 |
| 2012/0078540 A1 * | 3/2012 | McIntyre | G01P 13/025 |
| | | | 702/50 |
| 2016/0180611 A1 * | 6/2016 | Cadotte | G01P 5/16 |
| | | | 701/30.6 |
| 2017/0276790 A1 | 9/2017 | Lodden et al. | |
| 2018/0100776 A1 | 4/2018 | Bernus et al. | |
| 2018/0172720 A1 | 6/2018 | Miller et al. | |
| 2018/0259548 A1 | 9/2018 | Anderson et al. | |
| 2020/0013464 A1 * | 1/2020 | Wood | B64D 43/00 |
| 2020/0025787 A1 * | 1/2020 | Jackson | G01P 13/025 |

FOREIGN PATENT DOCUMENTS

| | | |
|---|---|---|
| EP | 3120125 A1 | 1/2017 |
| FR | 3044413 A1 | 6/2017 |
| JP | 2005291946 A | 10/2005 |
| WO | WO2015142235 A1 | 9/2015 |

OTHER PUBLICATIONS

Extended European Search Report for European Patent Application No. 19216161.0, dated May 15, 2020, 10 pages.

* cited by examiner

Fig. 4

AIR DATA PROBE WITH OPTICAL PRESSURE INTEGRATION

BACKGROUND

The present disclosure relates generally to air data probes, and in particular, to pressure sensors of air data probes.

Air data probes are installed on aircraft to measure air data parameters. Air data parameters may include pitot pressure, barometric static pressure, altitude, air speed, angle of attack, angle of sideslip, temperature, and/or any other parameter of interest. Air data probes may be, for example, pitot probes, pitot-static probes, or static pressure plates.

Air data probes gather pneumatic pressures by sampling air pressure at one or more ports along the probe in order to generate air data parameters. Air pressure is transported through pneumatic pathways to remote pressure sensors. Pneumatic pathways include pneumatic tubes that run throughout the air data probe. Pneumatic tubes can be problematic.

SUMMARY

An air data probe includes a probe head, a port within the probe head in fluid communication with external airflow, and a pneumatic pressure sensor mounted within the port.

An air data probe includes a body, a port within the body in fluid communication with external airflow, and an optical fiber pressure sensor mounted within the port.

DETAILED DESCRIPTION

In general, the present disclosure describes a pneumatic pressure sensor mounted within a port of an air data probe, or mounted at the point of measurement, to eliminate the need for pneumatic tubing throughout the air data probe. As a result, heating requirements are reduced and performance and reliability are improved. For example, pneumatic delay is prevented and ports and channels do not become obstructed.

Figure 1:
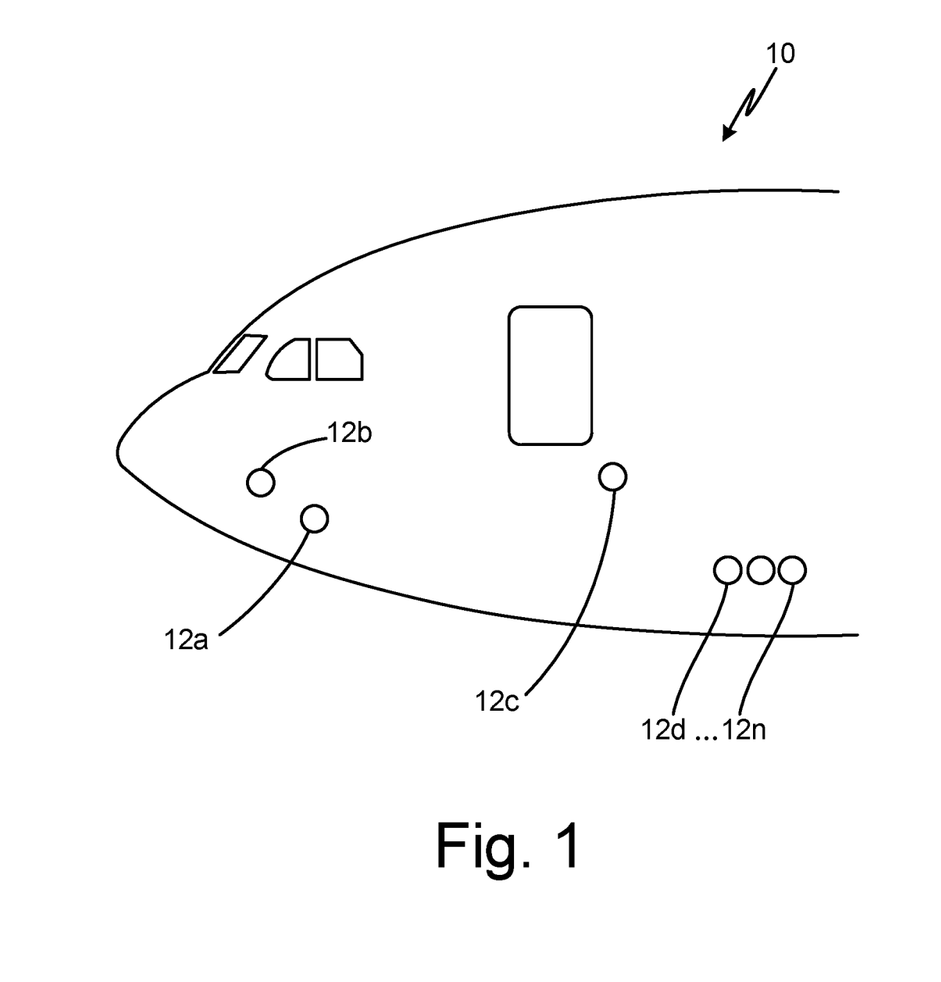
FIG. 1 is a diagram illustrating an aircraft that includes a plurality of air data probes.
Figure 2:
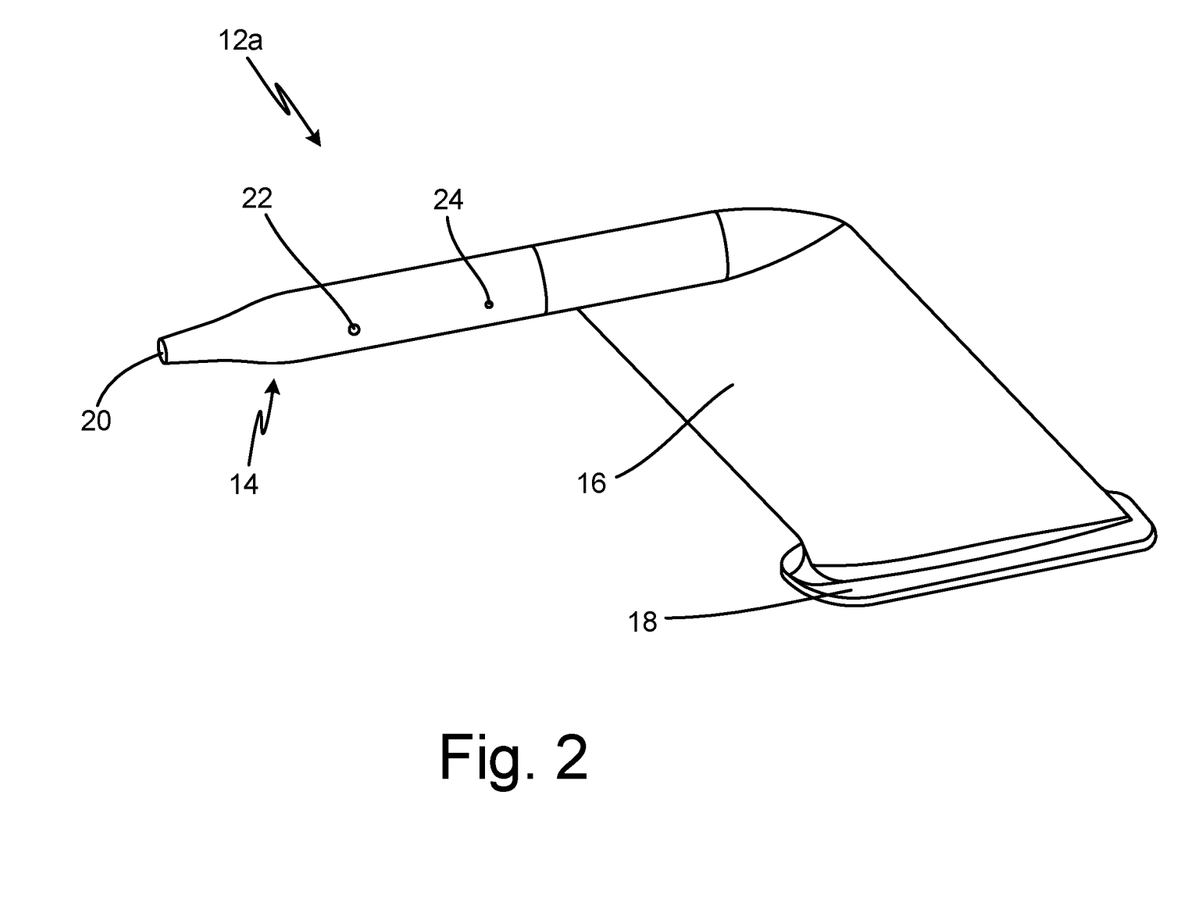
FIG. 2 is a perspective view of an air data probe.

FIGS. 1 and 2

FIG. 1 is a diagram illustrating aircraft 10 that includes a plurality of air data probes 12a-12n. Air data probes 12a-12n may be any type of probe such as, but not limited to, pitot probes, pitot-static probes, flush static plates, and any other suitable air data probe.

FIG. 2 is a perspective view of air data probe 12a. While illustrated as a pitot-static probe 12a, air data probe 12a may be any other type of air data probe 12a-12n. Air data probe 12a includes probe head 14, strut 16, and baseplate 18. Probe head 14 includes pitot port 20, static port 22, and drain hole 24.

Probe head 14 is a sensing head of air data probe 12a. Probe head 14 may have any number of ports positioned in probe head 14. A first end of probe head 14 is a forward portion of probe head 14. A second end of probe head 14 is connected to a first end of strut 16. Probe head 14 and strut 16 form a body of air data probe 12a. Strut 16 is blade-shaped. Internal components of air data probe 12n are located within probe head 14 and strut 16. A second end of strut 16 is connected to baseplate 18. Baseplate 18 is a mount for air data probe 12a. Baseplate 18 is connectable to an aircraft.

Pitot port 20 is an opening at the first end of probe head 14 and extends the length of probe head 14. Pitot port 20 is in fluid communication with external airflow and faces external airflow. Static port 22 is an opening positioned in a side of probe head 14. Static port 22 extends from an exterior surface of probe head 14 to an interior surface of probe head 14. Static port 22 is in fluid communication with external airflow and is perpendicular to external airflow. Probe head 14 may include any number of static ports 22. Drain hole 24 is an opening positioned in a side of probe head 14. Drain hole 24 extends from an interior surface of probe head 14 to an exterior surface of probe head 14.

Air data probe 12a is installed on an aircraft. Air data probe 12a may be mounted to a fuselage of the aircraft via baseplate 18 and fasteners, such as screws or bolts. Strut 16 holds probe head 14 away from the fuselage of the aircraft. Probe head 14 is exposed to external airflow. Pitot port 20 and static port 22 sample external airflow. Airflow samples at pitot port 20 and static port 22 are used to measure pressures for generating air data parameters, such as static pressure, altitude, air speed, angle of attack, and angle of sideslip. Drain hole 24 allows for water or ice that has entered probe head 14 along with external airflow to exit probe head 14 so as not to interfere with measurements. Air data probe 12a is required to maintain aircraft performance.

Figure 3:
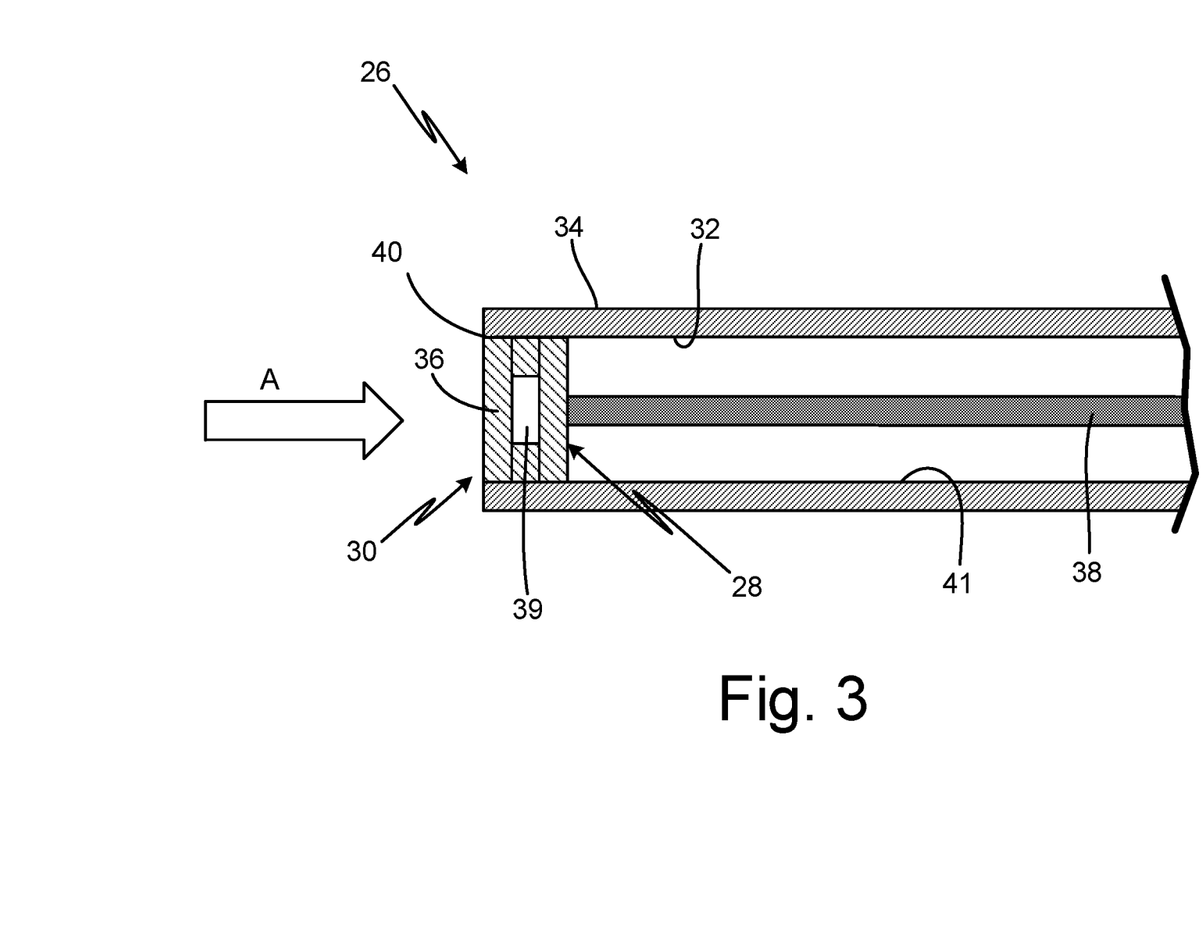
FIG. 3 is a partial cross-sectional schematic view of a probe head illustrating a pressure sensor flush-mounted at a pitot port.
Figure 4:
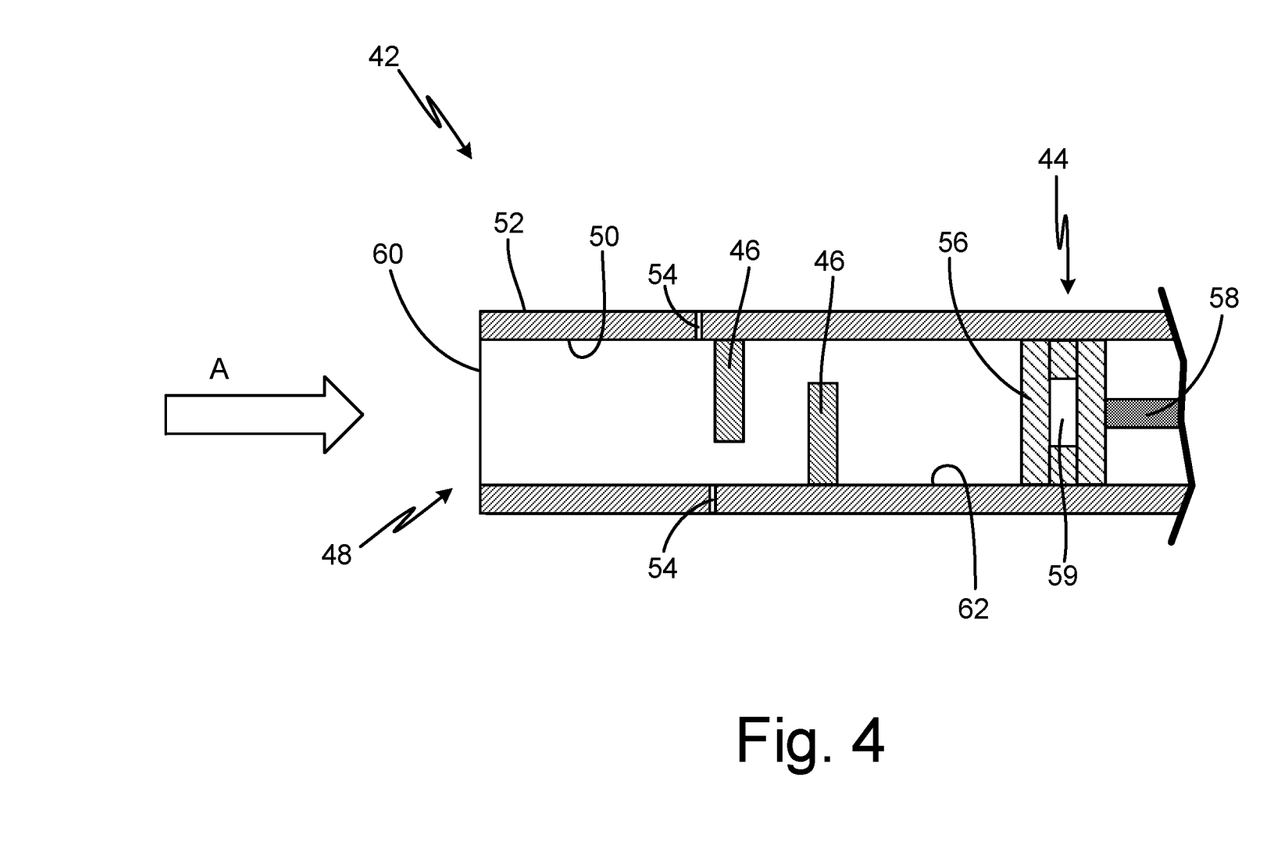
FIG. 4 is a partial cross-sectional schematic view of a probe head illustrating a pressure sensor mounted downstream of water dams within a pitot port.
Figure 5:
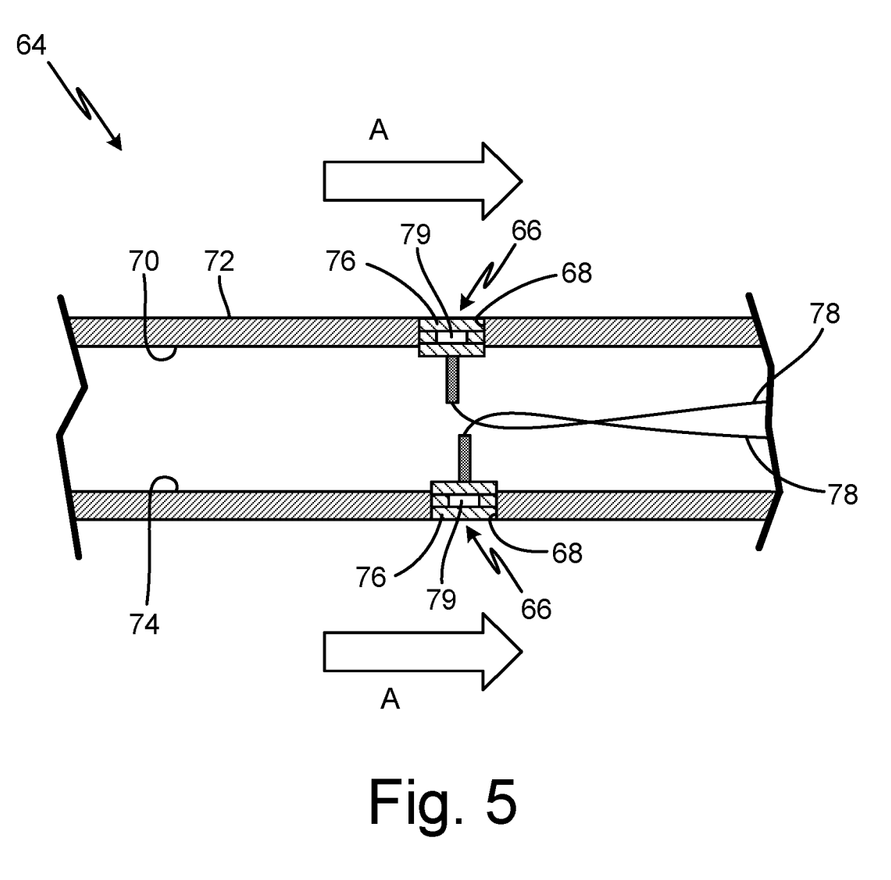
FIG. 5 is a partial cross-sectional schematic view of a probe head illustrating pressure sensors flush-mounted at static ports.

FIGS. 3-5 illustrate different ways pressure sensors can be mounted within a probe head of an air data probe, such as air data probes 12a-12n. FIG. 3 shows probe head 26, FIG. 4 shows probe head 42, and FIG. 5 shows probe head 64.

FIG. 3

FIG. 3 is a partial cross-sectional schematic view of probe head 26 illustrating pressure sensor 28 flush-mounted at pitot port 30. Probe head 26 includes pitot port 30, interior surface 32, and exterior surface 34. Pressure sensor 28 includes diaphragm 36, optical fiber 38, and cavity 39. Pitot port 30 includes inlet 40 and pitot channel 41.

Probe head 26 is a probe head of an air data probe, such as air data probe 12a. Thus, probe head 26 forms a body of an air data probe, such as a pitot-static probe. Pressure sensor 28 is a pneumatic pressure sensor. Pitot port 30 is an opening positioned at a first end of probe head 26 that extends through probe head 26 to a second end of probe head 26. Pitot port 30 is in fluid communication with external airflow A and is parallel with external airflow A. Pitot port 30 is defined by interior surface 32 of probe head 26. Probe head 26 has exterior surface 34 opposite interior surface 32. Exterior surface 34 is exposed to external airflow A. Pressure sensor 28 is mounted and sealed to interior surface 32 of probe head 26 within pitot port 30. Pressure sensor 28 is flush-mounted to pitot port 30 such that an end of pressure sensor 28 is flush with an end of pitot port 30. As such, diaphragm 36 of pressure sensor 28, which is at a first end of pressure sensor 28, is exposed to external airflow A. Diaphragm 36 is made of sapphire or any other suitable material capable of withstanding harsh environments. Optical fiber 38 is at a second end of pressure sensor 28 and is connected to diaphragm 36. Optical fiber 38 extends through probe head 26. Cavity 39 is a pressure cavity formed within pressure sensor 28 and defined by diaphragm 36. Pressure sensor 28 may be an optical fiber pressure sensor and may utilize a Fabry-Perot interferometer or a fiber Bragg grating. Pressure sensor 28 may be any other suitable optical fiber pressure sensor.

Pitot port 30 has inlet 40 at the first end of pitot port 30, or a first end of probe head 26. Pitot channel 41 extends from inlet 40 through probe head 26. Pressure sensor 28 is flush-mounted to pitot port 30 at inlet 40 such that an end of pressure sensor 28 is flush with inlet 40. Specifically, an exterior surface of diaphragm 36 is flush with inlet 40. Optical fiber 38 extends through pitot channel 41 to components within an aircraft.

Pressure sensor 28 measures the pressure of external airflow A at inlet 40 of pitot port 30. The pressure of external airflow A on diaphragm 36 of pressure sensor 28 is measured and communicated through optical fiber 38 to a flight computer. For example, when pressure sensor 28 utilizes a Fabry-Perot interferometer to perform pressure measurement, partial reflections of light are produced by the surfaces on either side of pressure cavity 39 defined by diaphragm 36 and their mutual interference is collected by optical fiber 38. The interference signal is monitored to provide pressure measurements. When pressure sensor 28 utilizes a fiber Bragg grating to perform pressure measurement, for example, a fiber Bragg grating in optical fiber 38 is connected to a side of diaphragm 36 to transfer strain indicative of movement of diaphragm 36 from diaphragm 36 to optical fiber 38 to provide pressure measurements. Such pressure measurements are used to generate air data parameters related to the aircraft flight condition.

Traditional air data probes have pressure sensors located remotely from the pitot port, which requires pneumatic tubing to route sampled air through the air data probe, and possibly through the aircraft as well, to the pressure sensor. Pressure sensor 28 is placed at the location of desired pressure, such that pneumatic tubes and other components, such as bulkheads, are not needed. As a result, pneumatic lag is avoided, power requirements for heating the air data probe are decreased, manufacturing is simplified, ice and moisture ingestion is eliminated, and blockage or obstruction of the pitot port and errors caused by edge geometry of the pitot port are prevented.

FIG. 4

FIG. 4 is a partial cross-sectional schematic view of probe head 42 illustrating pressure sensor 44 mounted downstream of water dams 46 within pitot port 48. Probe head 42 includes water dams 46, pitot port 48, interior surface 50, exterior surface 52, and drain holes 54. Pressure sensor 44 includes diaphragm 56, optical fiber 58, and cavity 59. Pitot port 48 includes inlet 60 and pitot channel 62.

Probe head 42 is a probe head of an air data probe, such as air data probe 12a. Thus, probe head 42 forms a body of an air data probe, such as a pitot-static probe. Pressure sensor 44 is a pneumatic pressure sensor. Water dams 46 are positioned within pitot port 48. Pitot port 48 is an opening positioned at a first end of probe head 42 that extends through probe head 42 to a second end of probe head 26. Pitot port 48 is in fluid communication with external airflow A and is parallel with external airflow A. Pitot port 48 is defined by interior surface 50 of probe head 42. Water dams 46 are connected to interior surface 50. Water dams 46 are staggered within pitot port 48. Interior surface 50 may be heated. Probe head 42 has exterior surface 52 opposite interior surface 50. Exterior surface 52 is exposed to external airflow A. Pressure sensor 44 is mounted and sealed to interior surface 50 of probe head 42 within pitot port 48. Exterior surface 52 may be heated. Drain holes 54 are openings that extend through a side of probe head 42 from interior surface 50 to exterior surface 52. Drain holes 54 are positioned upstream of water dams 46. In alternate embodiments, drain holes 54 may be downstream of water dams 46, between water dams 46, or in any other suitable location within probe head 42. Pressure sensor 44 is mounted to pitot port 48 downstream of water dams 46. As such, diaphragm 56 of pressure sensor 44, which is at a first end of pressure sensor 44, is exposed to external airflow A traveling through pitot port 48. Diaphragm 56 is made of sapphire or any other suitable material capable of withstanding harsh environments. Optical fiber 58 is at a second end of pressure sensor 44 is connected to diaphragm 56. Optical fiber 58 extends through probe head 42. Cavity 59 is a pressure cavity formed within pressure sensor 44 and defined by diaphragm 56. Pressure sensor 44 may be an optical fiber pressure sensor and may utilize a Fabry-Perot interferometer or a fiber Bragg grating. Pressure sensor 44 may be any other suitable optical fiber pressure sensor.

Pitot port 48 has inlet 60 at the first end of pitot port 48, or a first end of probe head 42. Pitot channel 62 extends from inlet 60 through probe head 42. Water dams 46 are positioned within pitot channel 62. Pressure sensor 44 is mounted to pitot port 48 within pitot channel 62. Diaphragm 56 is sealed to interior surface 50 within pitot channel 62. Optical fiber 58 extends through pitot channel 62 to components within an aircraft.

Because pressure sensor 44 is positioned downstream or aft of water dams 46, moisture, rain, ice crystals, and other fluid or particles in airflow A are trapped by water dams 46 and expelled through drain holes 54 before reaching pressure sensor 44. Interior surface 50 or exterior surface 52 may be heated to melt such ice crystals and prevent freezing. Pressure sensor 44 measures the pressure of external airflow A in pitot channel 62 of pitot port 48. The pressure of external airflow A on diaphragm 56 of pressure sensor 44 is measured and communicated through optical fiber 58 to a flight computer. For example, when pressure sensor 44 utilizes a Fabry-Perot interferometer to perform pressure measurement, partial reflections of light are produced by the surfaces on either side of pressure cavity 59 defined by diaphragm 56 and their mutual interference is collected by optical fiber 58. The interference signal is monitored to provide pressure measurements. When pressure sensor 44 utilizes a fiber Bragg grating to perform pressure measurement, for example, a fiber Bragg grating in optical fiber 58 is connected to a side of diaphragm 56 to transfer strain indicative of movement of diaphragm 56 from diaphragm 56 to optical fiber 58 to provide pressure measurements. Such pressure measurements are used to generate air data parameters related to the aircraft flight condition.

Pressure sensor 44 is less likely to freeze or become damaged by impact from ice, moisture, or other particles in airflow A. Pressure sensor 44 is placed at the location of desired pressure, within pitot port 48, such that pneumatic tubing and other components, such as bulkheads, are not needed. As a result, pneumatic lag is avoided, power requirements for heating the air data probe are decreased, manufacturing is simplified, ice and moisture ingestion is eliminated, and blockage or obstruction of the pitot port is reduced.

FIG. 5

FIG. 5 is a partial cross-sectional schematic view of probe head 64 illustrating pressure sensors 66 flush-mounted at static ports 68. Probe head 64 includes static ports 68, interior surface 70, exterior surface 72, and channel 74. Pressure sensors 66 each include diaphragm 76, optical fiber 78, and cavity 79.

Probe head 64 is a probe head of an air data probe, such as air data probe 12a. Thus, probe head 64 forms a body of an air data probe, such as a pitot-static probe. Pressure sensors 66 are pneumatic pressure sensors. Static ports 68 are openings positioned in a side of probe head 64. Static ports 68 each extend from interior surface 70 of probe head 64 to exterior surface 72 of probe head 64. Static ports 68 are in fluid communication with external airflow A and are perpendicular to external airflow A. Probe head 64 may include any number of static ports 68. Interior surface 70 of probe head 64 defines channel 74 within probe head 64. Channel 74 extends through probe head 64 from a first end of probe head 64 to a second end of probe head 64. Exterior surface 72 of probe head 64 is opposite interior surface 70 and is exposed to external airflow A. Channel 74 may be a pitot channel. Pressure sensors 66 are each flush-mounted within and sealed to static ports 68 of probe head 64 such that an end of each pressure sensor 66 is flush with exterior surface 72. As such, diaphragms 76 of pressure sensors 66, which are at first ends of pressure sensors 66, are exposed to external airflow A. Diaphragms 36 are made of sapphire or any other suitable material capable of withstanding harsh environments. An exterior surface of each diaphragm 76 is flush with exterior surface 72. Optical fibers 78 are at second ends of pressure sensors 66 and are connected to diaphragms 76. Optical fibers 78 extend through probe head 64 to components within an aircraft. Cavities 79 are pressure cavities formed within pressure sensor 66 and defined by diaphragms 76. Pressure sensors 66 may be optical fiber pressure sensors and may utilize Fabry-Perot interferometers or fiber Bragg gratings. Pressure sensors 66 may be any other suitable optical fiber pressure sensors.

Pressure sensors 66 measure the pressure of external airflow A at static ports 68. The pressures of external airflow A on diaphragms 76 of pressure sensors 66 are measured and communicated through optical fibers 78 to a flight computer. For example, when pressure sensor 66 utilizes a Fabry-Perot interferometer to perform pressure measurement, partial reflections of light are produced by the surfaces on either side of pressure cavity 79 defined by diaphragm 76 and their mutual interference is collected by optical fiber 78. The interference signal is monitored to provide pressure measurements. When pressure sensor 66 utilizes a fiber Bragg grating to perform pressure measurement, for example, a fiber Bragg grating in optical fiber 78 is connected to a side of diaphragm 76 to transfer strain indicative of movement of diaphragm 76 from diaphragm 76 to optical fiber 78 to provide pressure measurements. Such pressure measurements are used to generate air data parameters related to the aircraft flight condition.

Traditional air data probes have pressure sensors located remotely from the static port, which requires pneumatic tubing to route sampled air through the air data probe, and possibly through the aircraft as well, to the pressure sensor. Pressure sensors 66 are placed at the location of desired pressure, such that pneumatic tubes and other components, such as bulkheads, are not needed. As a result, pneumatic lag is avoided, power requirements for heating the air data probe are decreased, manufacturing is simplified, ice and moisture ingestion is eliminated, and blockage or obstruction of the static port and errors caused by edge geometry of the static port are prevented.

Figure 6:
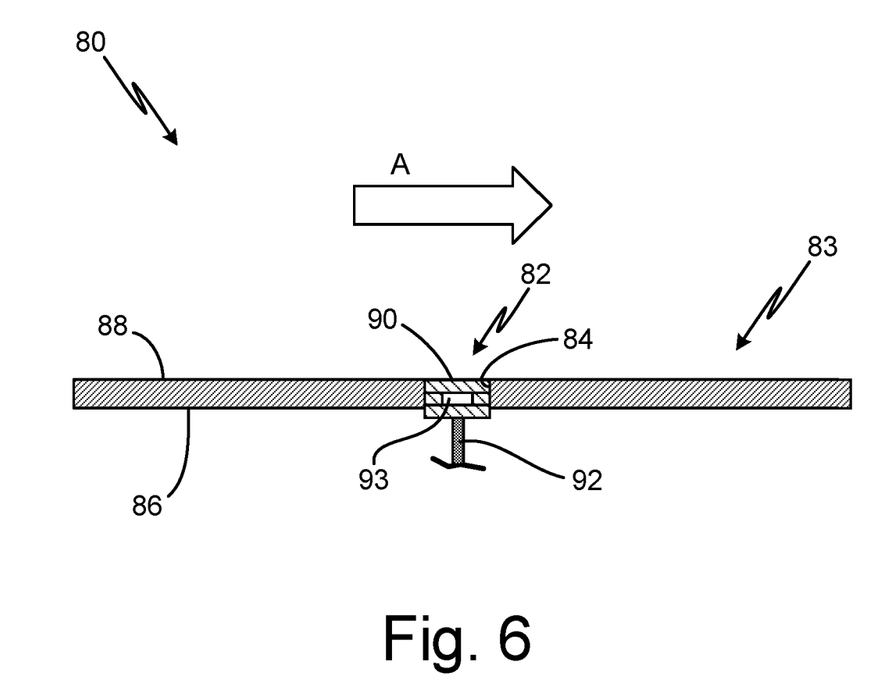
FIG. 6 is a partial cross-sectional schematic view of an air data probe with a pressure sensor.

FIG. 6 illustrates a pressure sensor mounted within a port of an air data probe, such as air data probes 12a-12n. FIG. 6 shows air data probe 80 as a flush static plate.

FIG. 6

FIG. 6 is a partial cross-sectional schematic view of air data probe 80 with pressure sensor 82. Air data probe 80 includes body 83, which includes port 84, interior surface 86, and exterior surface 88. Pressure sensor 82 includes diaphragm 90, optical fiber 92, and cavity 93.

Air data probe 80 is a flush static plate, or any other air data probe 12a-12n that includes a port. Pressure sensor 82 is a pneumatic pressure sensor. Air data probe 80 has body 83. Port 84 is an opening that extends from interior surface 86 of body 83 to exterior surface 88 of body 83. Exterior surface 88 of body 83 is opposite interior surface 86 and is exposed to external airflow A. As such, port 84 is in fluid communication with external airflow A. Port 84 is a static port. Port 84 is perpendicular to external airflow A. Body 83 may include any number of ports 84. Pressure sensor 82 is flush-mounted within and sealed to port 84 such that an end of pressure sensor 82 is flush with an end of port 84. As such, diaphragm 90 of pressure sensor 82, which is at a first end of pressure sensor 82, is exposed to external airflow A. Diaphragm 90 is made of sapphire or any other suitable material capable of withstanding harsh environments. An exterior surface of each diaphragm 90 is flush with exterior surface 88. Optical fiber 92 is at a second end of pressure sensor 82 and is connected to diaphragm 90. Optical fiber 92 extends to components within an aircraft. Cavity 93 is a pressure cavity formed within pressure sensor 82 and defined by diaphragm 90. Pressure sensor 82 may be an optical fiber pressure sensor and may utilize a Fabry-Perot interferometer or a fiber Bragg grating. Pressure sensor 82 may be any other suitable optical fiber pressure sensor.

Pressure sensor 82 measures the pressure of external airflow A at port 84. The pressure of external airflow A on diaphragm 90 of pressure sensor 82 is measured and communicated through optical fiber 92 to a flight computer. For example, when pressure sensor 82 utilizes a Fabry-Perot interferometer to perform pressure measurement, partial reflections of light are produced by the surfaces on either side of pressure cavity 93 defined by diaphragm 90 and their mutual interference is collected by optical fiber 92. The interference signal is monitored to provide pressure measurements. When pressure sensor 82 utilizes a fiber Bragg grating to perform pressure measurement, for example, a fiber Bragg grating in optical fiber 92 is connected to a side of diaphragm 90 to transfer strain indicative of movement of diaphragm 90 from diaphragm 90 to optical fiber 92 to provide pressure measurements. Such pressure measurements are used to generate air data parameters related to the aircraft flight condition.

Traditional air data probes have pressure sensors located remotely from the port, which requires pneumatic tubing to route sampled air through the air data probe and possibly through the aircraft as well to the pressure sensor. Pressure sensor 82 is placed at the location of desired pressure, such that pneumatic tubes and other components, such as bulkheads, are not needed. As a result, pneumatic lag is avoided, power requirements for heating the air data probe are decreased, manufacturing is simplified, ice and moisture ingestion is eliminated, and blockage or obstruction of the port and errors caused by edge geometry of the port are prevented.

Air data probes can include any number of pressure sensors, including pressure sensors 28, 44, 66, and 82. While pressure sensors have been described in reference to optical fiber pressure sensors (including diaphragms and optical fibers), any suitable pressure sensor, such as a MEMS pressure sensor (which includes electrical wires in place of optical fibers), may be mounted within a port to achieve the benefits listed above. Optical fiber pressure sensors utilizing optical fibers, however, have the added benefits of (1) withstanding higher temperatures than pressure sensors utilizing electrical wiring and (2) eliminating electrical issues or concerns, such as electromagnetic interference and insulation resistance, which may be associated with pressure sensors utilizing electrical wiring.

Discussion of Possible Embodiments

The following are non-exclusive descriptions of possible embodiments of the present invention.

An air data probe includes a probe head; a port within the probe head in fluid communication with external airflow; and a pneumatic pressure sensor mounted within the port.

The air data probe of the preceding paragraph can optionally include, additionally and/or alternatively, any one or more of the following features, configurations and/or additional components:

The pneumatic pressure sensor is flush-mounted within the port.

The port is a static port.

The port is a pitot port.

The port is a pitot port and the pneumatic pressure sensor is mounted downstream of a water dam.

The pneumatic pressure sensor is an optical fiber pressure sensor.

The optical fiber pressure sensor utilizes a fiber Bragg grating to perform pressure measurement.

The optical fiber pressure sensor utilizes a Fabry-Perot interferometer to perform pressure measurement.

The pneumatic pressure sensor includes a diaphragm and an optical fiber connected to the diaphragm such that the optical fiber extends through the probe head.

The diaphragm is made of sapphire.

An air data probe includes a body; a port within the body in fluid communication with external airflow; and an optical fiber pressure sensor mounted within the port.

The air data probe of the preceding paragraph can optionally include, additionally and/or alternatively, any one or more of the following features, configurations and/or additional components:

The air data probe is a flush static plate.

The optical fiber pressure sensor is flush-mounted within the port.

The port is a static port.

The port is a pitot port.

The body is a probe head.

The port is a pitot port and the optical fiber pressure sensor is mounted downstream of a water dam.

The optical fiber pressure sensor utilizes a fiber Bragg grating to perform pressure measurement.

The optical fiber pressure sensor utilizes a Fabry-Perot interferometer to perform pressure measurement.

The optical fiber pressure sensor includes a diaphragm and an optical fiber connected to the diaphragm, wherein the diaphragm is made of sapphire.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
a probe head;
a port within the probe head in fluid communication with external airflow; and
a pneumatic pressure sensor mounted within the port.

2. The air data probe of claim 1, wherein the pneumatic pressure sensor is flush-mounted within the port.

3. The air data probe of claim 1, wherein the port is a static port.

4. The air data probe of claim 1, wherein the port is a pitot port.

5. The air data probe of claim 1, wherein the port is a pitot port and the pneumatic pressure sensor is mounted downstream of a water dam.

6. The air data probe of claim 1, wherein the pneumatic pressure sensor is an optical fiber pressure sensor.

7. The air data probe of claim 6, wherein the optical fiber pressure sensor utilizes a fiber Bragg grating to perform pressure measurement.

8. The air data probe of claim 6, wherein the optical fiber pressure sensor utilizes a Fabry-Perot interferometer to perform pressure measurement.

9. The air data probe of claim 1, wherein the pneumatic pressure sensor includes a diaphragm and an optical fiber connected to the diaphragm such that the optical fiber extends through the probe head.

10. The air data probe of claim 9, wherein the diaphragm is made of sapphire.

11. An air data probe comprising:
a body;
a port within the body in fluid communication with external airflow; and
an optical fiber pressure sensor mounted within the port.

12. The air data probe of claim 11, wherein the air data probe is a flush static plate.

13. The air data probe of claim 11, wherein the optical fiber pressure sensor is flush-mounted within the port.

14. The air data probe of claim 11, wherein the port is a static port.

15. The air data probe of claim 11, wherein the port is a pitot port.

16. The air data probe of claim 11, wherein the body is a probe head.

17. The air data probe of claim 11, wherein the port is a pitot port and the optical fiber pressure sensor is mounted downstream of a water dam.

18. The air data probe of claim 11, wherein the optical fiber pressure sensor utilizes a fiber Bragg grating to perform pressure measurement.

19. The air data probe of claim 11, wherein the optical fiber pressure sensor utilizes a Fabry-Perot interferometer to perform pressure measurement.

20. The air data probe of claim 11, wherein the optical fiber pressure sensor includes a diaphragm and an optical fiber connected to the diaphragm, wherein the diaphragm is made of sapphire.

* * * * *